US012669099B2

(12) United States Patent
Eismark et al.

(10) Patent No.: US 12,669,099 B2
(45) Date of Patent: Jun. 30, 2026

(54) NOZZLE CAP, A FUEL GAS INJECTION AND A HYDROGEN INTERNAL COMBUSTION ENGINE

(71) Applicant: VOLVO TRUCK CORPORATION, Gothenburg (SE)

(72) Inventors: Jan Eismark, Gothenburg (SE); Rickard Ehleskog, Hisings Backa (SE); Tommy Simonsson, Stenungsund (SE); Gustavo Hindi, Surte (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/720,177

(22) PCT Filed: Dec. 17, 2021

(86) PCT No.: PCT/EP2021/086540
§ 371 (c)(1),
(2) Date: Jun. 14, 2024

(87) PCT Pub. No.: WO2023/110127
PCT Pub. Date: Jun. 22, 2023

(65) Prior Publication Data
US 2025/0052213 A1 Feb. 13, 2025

(51) Int. Cl.
*F02M 21/02* (2006.01)
*F02M 61/18* (2006.01)

(52) U.S. Cl.
CPC .... *F02M 21/0206* (2013.01); *F02M 61/1886* (2013.01); *F02M 61/1893* (2013.01)

(58) Field of Classification Search
CPC ........... F02M 21/0206; F02M 61/1886; F02M 61/1893
See application file for complete search history.

(56) References Cited

U.S. PATENT DOCUMENTS 2,172,556 A * 9/1939 Edwards ................ F02M 61/08 239/452
5,551,638 A 9/1996 Caley
(Continued)

FOREIGN PATENT DOCUMENTS

CN 103534476 A 1/2014
DE 2825998 A1 1/1980
(Continued)

OTHER PUBLICATIONS

International Search Report and Written Opinion of the International Searching Authority in corresponding International Application No. PCT/EP2021/086540 mailed Aug. 22, 2022 (12 pages).
(Continued)

*Primary Examiner* — Kevin A Lathers
(74) *Attorney, Agent, or Firm* — Jeffri A. Kaminski; Venable LLP

(57) ABSTRACT

A nozzle cap for a fuel gas injection arrangement of an internal combustion engine has: a body part defining an inner volume for accommodating a part of a movable valve arrangement, an inlet for receiving gaseous fuel, and at least one outlet arranged at an axial end portion of the nozzle cap. The at least one outlet permits discharge of one or more gas jets of fuel into a combustion chamber of the internal combustion engine. The axial end portion of the nozzle cap has a radial protrusion extending from an inner side of the nozzle cap towards an axial center axis and is delimited in a circumferential direction by axially-extending side sections, said radial protrusion having an inner surface region for reducing a crossflow of the fuel gas flow inside the nozzle cap and guiding said fuel gas flow towards the at least one outlet.

25 Claims, 7 Drawing Sheets

(56) References Cited

U.S. PATENT DOCUMENTS

| | | | |
|---|---|---|---|
| 10,208,711 | B2 | 2/2019 | Moser et al. |
| 10,260,450 | B2 | 4/2019 | Jacob |
| 2004/0021015 | A1 | 2/2004 | Murdoch |
| 2006/0131447 | A1 | 6/2006 | Masuda et al. |
| 2016/0237971 | A1 | 8/2016 | Rowan et al. |
| 2017/0321636 | A1 | 11/2017 | Moser et al. |
| 2017/0328310 | A1 | 11/2017 | Hohl |
| 2018/0363591 | A1 | 12/2018 | Etcheverry et al. |

FOREIGN PATENT DOCUMENTS

| | | | |
|---|---|---|---|
| DE | 102004044820 | A1 | 3/2006 |
| DE | 102015225216 | A1 | 6/2017 |
| DE | 102016213530 | A1 | 1/2018 |
| DE | 102017219932 | A1 | 5/2019 |
| EP | 234642 | A1 | 9/1987 |
| WO | 9808014 | A1 | 2/1998 |
| WO | 2012095450 | A1 | 7/2012 |
| WO | 2018036966 | A1 | 3/2018 |

OTHER PUBLICATIONS

Written Opinion of the International Preliminary Examining Authority (Second Written Opinion) in corresponding International Application No. PCT/EP2021/086540 mailed Sep. 28, 2023 (5 pages).

International Preliminary Report on Patentability in corresponding International Application No. PCT/EP2021/086540 mailed Feb. 23, 2024 (6 pages).

Non Final Office Action dated Mar. 26, 2025 in corresponding U.S. Appl. No. 18/720,133, 13 pages.

Notice of Allowance dated Jul. 30, 2025 in corresponding U.S. Appl. No. 18/720,133, 7 pages.

European Communication under Rule 71(3) EPC dated Dec. 17, 2025 in corresponding European Patent Application No. 21843600.4, 8 pages.

* cited by examiner

NOZZLE CAP, A FUEL GAS INJECTION AND A HYDROGEN INTERNAL COMBUSTION ENGINE

CROSS-REFERENCE TO RELATED APPLICATIONS

This application is a U.S. National Stage application of International Application No. PCT/EP2021/086540, filed Dec. 17, 2021 and published on Jun. 22, 2023 as WO 2023/110127, all of which is hereby incorporated by reference in its entirety.

TECHNICAL FIELD

The present disclosure relates to a nozzle cap for a fuel injection nozzle operable in a hydrogen internal combustion engine. The present disclosure also relates to a corresponding fuel gas injection arrangement, to a hydrogen internal combustion engine, and to a vehicle. Although the disclosure will be described in relation to a vehicle in the form of a truck, the disclosure can also be efficiently incorporated in other vehicles types such as e.g. buses and construction equipment, as well as for marine applications, genset applications, and cars.

BACKGROUND

A fuel gas injection arrangement for a hydrogen internal combustion engine may typically be operable at critical conditions at which the hydrogen flow becomes sonic or even locally supersonic. One problem with this type of fuel flow is difficulties to maintain the initial direction of the jet out of the injector nozzle.

One commonly used hydrogen nozzle for injecting hydrogen into a combustion chamber is a so called pintle-valve nozzle. In this type of nozzles, an angle of the upper part of the pintle valve surface is a design-parameter which may determine the outgoing direction of the jet. In order to further control the outgoing direction of the jet, a pintle-valve can be combined with a nozzle cap. The nozzle cap may generally comprise one or several holes and the configuration of the holes may often be used to determine the direction of the outgoing jet.

A particular problem with a hydrogen nozzle is that the nozzle cap hole exit area needs to be larger than conventional nozzles for internal combustion engines operable on liquid fluids, such as diesel fuel. This means that a major part of the nozzle cap side and bottom sides are open holes. It may therefore be difficult to design the holes to direct the jets in a wanted direction, especially at sonic or even locally supersonic hydrogen flow. Further, this may lead to disturbing vortices in the cap volume. Such disturbing vortices may re-direct part of the flow in an unfavourable direction. Furthermore, the cap-volume as such may contain residual hydrogen-containing gases that may auto-ignite at an unfavourable timing. Accordingly, there is room for improvements with regards to fuel gas flow guidance in nozzles for internal combustion engine systems, in particular for internal combustion engine systems operable on a fuel gaseous medium such as hydrogen.

SUMMARY

An object of the disclosure is to provide an improved nozzle cap for a fuel gas injection arrangement of an internal combustion engine, in which streams of fuel gas through the injection arrangement can be controlled in an efficient manner so as to exit the nozzle cap in the form of one or more gas jets. According to a first aspect of the disclosure, the object is achieved by a nozzle cap according to claim 1. The object is also achieved by the other independent claims. The dependent claims are directed to advantageous embodiments of the disclosure.

According to the first aspect of the disclosure, there is provided a nozzle cap for a fuel gas injection arrangement of an internal combustion engine. The nozzle cap comprises a body part defining an inner volume for accommodating a part of a movable valve arrangement, an inlet for receiving gaseous fuel, at least one outlet arranged at an axial end portion of the nozzle cap. The at least one outlet is configured to permit discharge of one or more gas jets of fuel into a combustion chamber of the internal combustion engine.

Moreover, the axial end portion of the nozzle cap comprises a radial protrusion extending from an inner side of the nozzle cap towards an axial centre axis and further delimited in a circumferential direction by axially-extending side sections, the radial protrusion having an inner surface region for reducing a crossflow of the fuel gas flow inside the nozzle cap and guiding the fuel gas flow towards the at least one outlet.

The present disclosure is based on the insight that one of many challenges in providing reliable hydrogen internal combustion engine systems is the lack of efficient fuel gas injection hardware systems. Byway of example, there is a desire to provide a more dynamic direction of the outgoing fuel gas jets from the outlet(s) of the injection arrangement. The proposed nozzle cap contributes to gain an improved control of the outgoing fuel flow of one or more gas fuel jets. With an improved control of the jet(s), it also becomes possible to co-design other components of the ICE system as the piston and the ignition source device. The proposed nozzle cap may also provides for facilitating the flow of fuel gas through the injector and nozzle cap so as to enhance the combustion process of fuel gas within the ICE systems, such as an ICE system operable on hydrogen.

By the arrangement of the radial protrusion having an inner surface region for reducing a crossflow of the fuel gas flow inside the nozzle cap and guiding the fuel gas flow towards the at least one outlet, it becomes possible to improve the control of the outgoing flow of fuel gas from the injector prior to combustion of the fuel in the combustion chamber of the ICE. As such, the proposed nozzle cap facilitates the interplay between the injector configuration, ambient conditions, and combustion. Accordingly, by improved control of the outgoing flow from the nozzle cap, the mixing of fuel and air is improved, which generally occurs during the compression stroke. With improved mixing follows improved ignition and combustion events.

In particular, the proposed nozzle cap is suitable for spark-ignited internal combustion engines, utilizing hydrogen direct injection so as to achieve high engine power output and efficiency with low emissions. One of the many advantages of using hydrogen in an ICE as a clean alternative fuel is its zero-carbon content. This means that carbon-based emissions, mainly CO, $CO_2$ and soot.

Thus, by the provision of the herein proposed nozzle cap, hydrogen streams are guided towards the nozzle cap outlet such that the injection of hydrogen into the hydrogen internal combustion engine can be efficiently performed.

The at least one outlet may be provided in several different shapes and geometries, and may generally also encompass both an outlet region with a single hole and an outlet region with a number of holes of the same size or different sizes. The following describes a number of conceivable examples of the outlet.

In one embodiment, a circumferential extension of the at least one outlet is at least partly delimited by the radial protrusion. In other words, a total circumferential extension of the at least one outlet is less than 360 degrees. One advantage is that 360 degrees flow over the valve seat is combined with 360 degrees flow also at the cap outlet which may contribute to a more symmetric solution with low flow losses (pressure drop).

In one embodiment, the at least one outlet comprises a plurality of circumferentially spaced apart outlet regions. An advantage is that the flow entering the combustion chamber can be split into a number of separate flows, whereby the control of the hydrogen flow into the combustion chamber may be improved. A nozzle cap with two or more outlet regions may be particularly useful for certain ICE systems and piston designs.

The nozzle cap may further comprise a number of radial protrusions distributed in the circumferential direction to at least partly define the plurality of the circumferentially spaced apart outlet regions.

The number of radial protrusions may be two and the number of the circumferentially spaced apart outlet regions may be two. Moreover, the two radial protrusions may be arranged essentially opposite each other. By way of example, the two radial protrusions may be arranged essentially radially opposite each other. It should however be readily understood that the at least one outlet may comprise a plurality of outlet regions, such as three or more outlet regions. Analogously, the at least one outlet may comprise, or be defined by, a plurality of radial protrusions, such as three or more radial protrusions.

The inner surface region may generally be configured to function as a flow divider element. The inner surface region may comprise a convex surface. The convex surface provides for guiding the flow of fuel gas towards the outlet (exit). The convex surface may extend axially from the axial end portion of the nozzle cap and in a direction towards the inlet. The convex surface may be provided by a bulge portion. The inner surface region may extend in the circumferential direction between the axially extending side sections.

The inner side of the nozzle cap may further comprise an intermediate surface region arranged axially above the radial protrusion. The intermediate surface region may have a circumferential inner flow-guiding portion for directing the flow of fuel gas inside the nozzle cap.

The inlet valve arrangeable in the inlet of the nozzle cap may for example be a pintle valve that is per se known in the art, although other types or valves are conceivable.

The outlet of the nozzle cap directs the hydrogen stream into, or towards, a combustion chamber of the hydrogen internal combustion engine.

The nozzle cap may be an outer part of the fuel gas injection arrangement. The nozzle cap may be configured to attach to an injector body of the fuel gas injection arrangement. In addition, the nozzle cap may be a downstream part of the fuel gas injection arrangement.

According to a second aspect of the disclosure, there is provided a fuel gas injection arrangement for admitting at least one fuel gas jet into a combustion chamber of an internal combustion engine. The fuel gas injection arrangement comprises a nozzle cap according to the first aspect and/or according to each one of the embodiments and features as described in relation to the first aspect. The fuel gas injection arrangement further comprises an inlet valve arrangement at least partly housed by the nozzle cap. The inlet valve arrangement is movable between a closed position at which a portion of the inlet valve arrangement is arranged in abutment with a valve seat to prevent fuel gas from entering the inlet of the nozzle cap, and an open position at which the flow of fuel gas is allowed to flow between the inlet and the at least one outlet of the nozzle cap. The wording “portion of the inlet valve arrangement is arranged in abutment with the valve seat” should generally be construed in such a way that the portion of the inlet valve arrangement is in physical contact (surface-to-surface contact) with the valve seat such that hydrogen is prevented to enter the combustion chamber.

Effects and features of the second aspect of the disclosure are largely analogous to those described above in connection with the first aspect. According to a non-limiting example, the fuel injection arrangement can suitably be used for an increased hydrogen flow pressure of approximately 60 bar. The fuel injection arrangement can hence be used in so-called medium pressure hydrogen implementations. The fuel injection arrangement may also be used in other hydrogen implementations, such as low medium pressure hydrogen implementations (below 60 bar). The fuel injection arrangement may also be used in high pressure hydrogen implementations.

The combination of the nozzle cap with the valve arrangement in the nozzle cap provides for a particularly improved control of the outgoing jet(s).

The valve arrangement may comprise an axially extending flow guiding portion comprising an envelope surface facing the inner side of the nozzle cap. The envelope surface comprises a valve protrusion protruding radially towards the inner side of the nozzle cap.

The circumferential inner flow-guiding portion of the nozzle cap may comprise a protrusion protruding radially towards the envelope surface of the flow guiding portion.

The nozzle protrusion may be arranged axially between the valve protrusion and the at least one outlet of the nozzle cap.

The valve protrusion and the circumferential inner flow-guiding portion of the nozzle cap may at least partly overlap in the radial direction. In this manner, the flow of hydrogen is obliged to follow the flow guiding portion of the inlet valve arrangement in a more satisfactory manner. In further detail, since the valve protrusion and the nozzle protrusion overlap in the radial direction, the flow of hydrogen is prevented from flowing in a pure axial direction from the valve seat and into the combustion chamber. An advantage is that an improved control of the hydrogen flow is provided as any direct vertical passage of the hydrogen flow is blocked. Moreover, radially overlapping the valve protrusion and the nozzle protrusion can advantageously be combined with a smaller nozzle outlet area, whereby the injection pressure of the hydrogen can be increased.

The valve protrusion may extend circumferentially around the envelope surface. Hereby, it is even further secured that a direct vertical passage of hydrogen is blocked.

The valve protrusion and the protrusion of the circumferential inner flow-guiding portion may be arranged at an axial distance from each other when the inlet valve arrangement assumes the open position. Hereby, it is assured that the valve protrusion and the nozzle protrusion will not interfere with each other and block the flow of hydrogen when the inlet valve arrangement is open.

The valve protrusion may be arranged at an axial distance from the inlet of the nozzle cap when the inlet valve arrangement assumes the closed position.

The inlet valve arrangement may comprise a valve portion and an axially extending head portion having an upper end arranged at the valve portion, and a lower end facing away from the valve portion, wherein the valve portion may comprise a surface arranged in abutment with the valve seat when the inlet valve arrangement assumes the closed position.

The head portion can thus advantageously be provided as an add-on portion to a conventional valve portion. An advantage is that the manufacturing of the inlet valve arrangement is simplified.

The valve portion and the head portion may be integrally formed with each other.

The axially extending flow guiding portion may form part of the head portion.

The head portion may comprise a taper shaped surface between the valve protrusion and the lower end. An advantage is that the direction of the hydrogen entering the combustion chamber can be controlled as desired.

A diameter of the head portion may increase along the taper shaped surface in a direction from the valve protrusion to the lower end. In this configuration of the head portion, the flow of hydrogen is radially diverging when entering the combustion chamber, i.e. the flow of hydrogen is directed radially outwards in the combustion chamber. An advantage is that the flow of hydrogen from the fuel injection arrangement into the combustion chamber can hereby maintain its initial direction and reducing the risk of hydrogen fuel jets collapsing. It is also easier to match the shape of the piston bowl to a well-defined flow pattern. With a more uniform flow, the hydrogen fuel is able to reach further away from the nozzle outlet which is beneficial for the mixing process of hydrogen and air.

A diameter of the head portion may decrease along the taper shaped surface in a direction from the valve protrusion to the lower end. In this configuration, the flow of hydrogen is on the other hand radially converging when entering the combustion chamber, i.e. the flow of hydrogen is directed radially inwards in the combustion chamber. The converging flow of hydrogen for a piston bowl shape adapted for receiving the flow of hydrogen at a radially centre. In a similar vein as the diverging flow described above, the converging flow promotes a distinct flow direction, here uniformly arranged, reducing the risk of hydrogen fuel jets collapsing.

A portion of the valve arrangement may be arranged in a radial face-to-face orientation with the at least one radial protrusion when the valve arrangement assumes the open position. By providing the valve arrangement in close proximity with the at least one radial protrusion, the flow of hydrogen is directed to the outlet exit(s) that is at least partly formed by the at least one radial protrusion. By the radial face-to-face orientation between the valve and the radial protrusion, there is provided a clearance, or gap, therebetween. Generally the surfaces of the valve and the radial protrusion should not be in contact with each other.

The fuel gas injection arrangement may be a hydrogen fuel gas injection arrangement.

The fuel gas injection arrangement may comprise a control unit configured to control the operation of the fuel gas injection arrangement.

The fuel gas injection arrangement may be controllable by the control unit to inject fuel into a combustion chamber with a low injection pressure of between 15 to 60 bar. Preferably, the fuel gas injection arrangement may be controllable by the control unit to inject fuel into a combustion chamber with a low injection pressure of between 15 to 30 bar.

The control unit may be configured to control the fuel gas injection arrangement in response to a control signal containing data being indicative of a hydrogen system pressure, a number of injections per engine cycle, a timing for start of each injection, a duration of each injection, a separation time between injections.

According to a third aspect of the disclosure, there is provided a hydrogen internal combustion engine comprising a nozzle cap according to the first aspect and/or a fuel gas injection arrangement according to the second aspect.

According to a fourth aspect of the disclosure, there is provided a vehicle comprising a fuel gas injection arrangement according to the second aspect and/or a hydrogen internal combustion engine according to the third aspect. Effects and features of the third and fourth, aspects are largely analogous to those described above in relation to the first aspect and the second aspect.

Further advantages and advantageous features of the disclosure are disclosed in the following description and in the dependent claims. It should also be readily appreciated that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof. As used herein, the terms "first", "second", and "third" may be used interchangeably to distinguish one component from another and are not intended to signify location or importance of the individual components.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS

Figure 1:
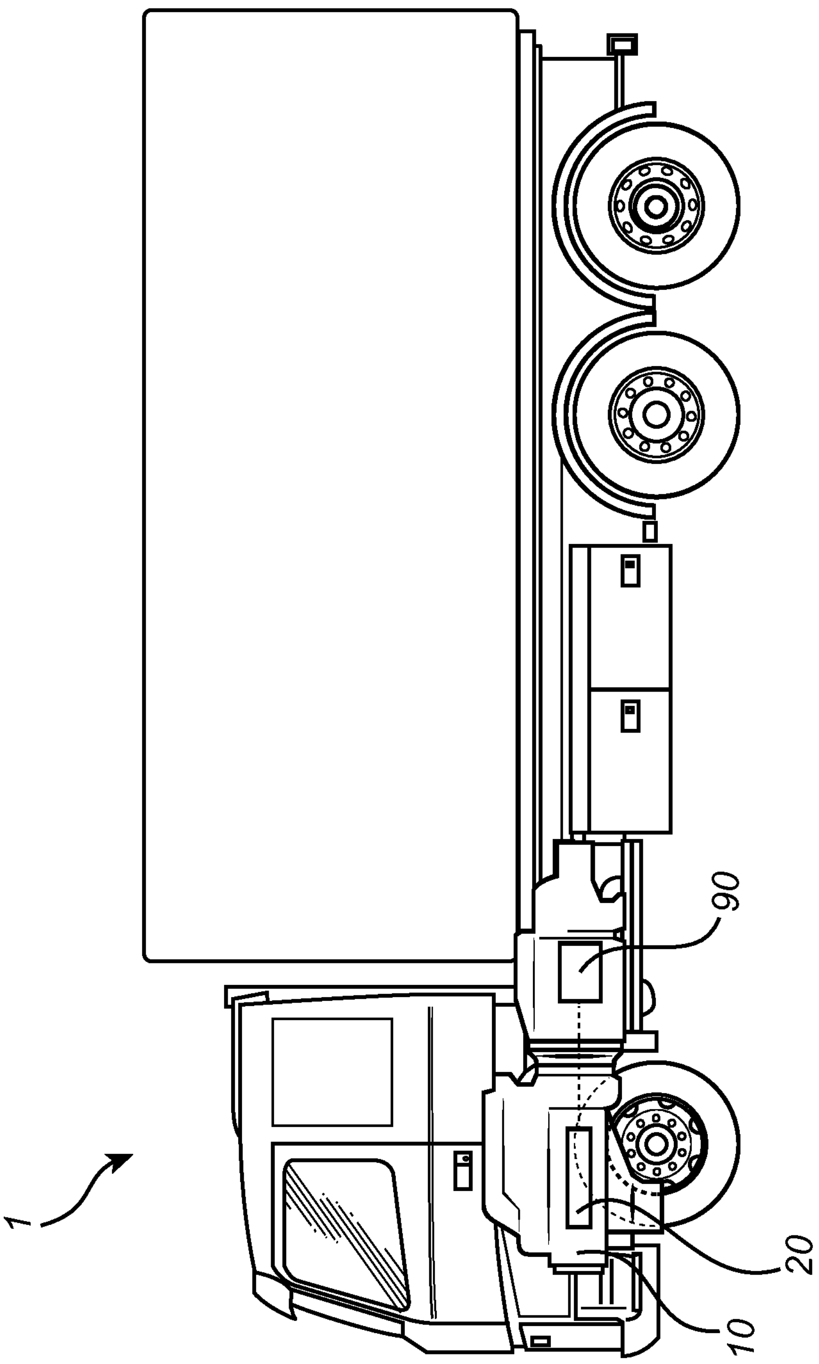
FIG. 1 is a vehicle in the form a truck according to example embodiments of the disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 1 in the form of a truck. The vehicle 1 comprises an internal combustion engine, ICE, system 10 for powering and driving the vehicle 1. The ICE system 10 in FIG. 1 also comprises an ICE 20. In this example, the ICE system 10 is a hydrogen piston ICE system. The combustion in such hydrogen ICE system is based on a combustion of air and hydrogen, as is commonly known in the art. While the combustion of hydrogen with oxygen may only produce water as its only product in a pure combustion process between hydrogen and oxygen, a hydrogen ICE system based on combustion of air and hydrogen generally produce water, heat and NOx, as is commonly known in the art. In addition, hydrogen can be combusted in an internal combustion engine over a wide range of fuel-air mixtures. A hydrogen ICE system may be operated to produce very low emissions during certain conditions. The hydrogen ICE system may generally operate based on hydrogen in gaseous form, while the hydrogen can be stored in liquid or gaseous form in the vehicle by a suitable hydrogen gas tank.

The truck 1 may be a hybrid electric vehicle. By way of example, the hybrid electric vehicle comprises an electric propulsion system having at least one high-voltage battery and at least one electric machine, and further the hydrogen ICE system 10. The hydrogen ICE 20 of the truck 1 further comprises a fuel gas injection arrangement with a nozzle cap as disclosed herein, e.g. in FIGS. 2 and 3, and further in FIGS. 4A to 4D and 5. By way of example, the fuel gas injection arrangement is a fuel gas injection arrangement configured to directly inject hydrogen gas fuel into a combustion chamber 15 of the ICE 20, as may be gleaned from FIG. 2.

As depicted in FIG. 1, the ICE system 10 further comprises a control unit 90. The control unit 90 is arranged in communication with the components of the ICE system 10, in particular the fuel gas injection arrangement 100. As will be further described herein, the control unit 90 is configured to control the fuel gas injection arrangement 100. The control unit 90 is here an integral part of the electronic control unit of the vehicle. The control unit 90 may also be a separate part of the vehicle 1 and communicate with the main electronic control unit for controlling the vehicle and various parts of the vehicle.

Figure 2:
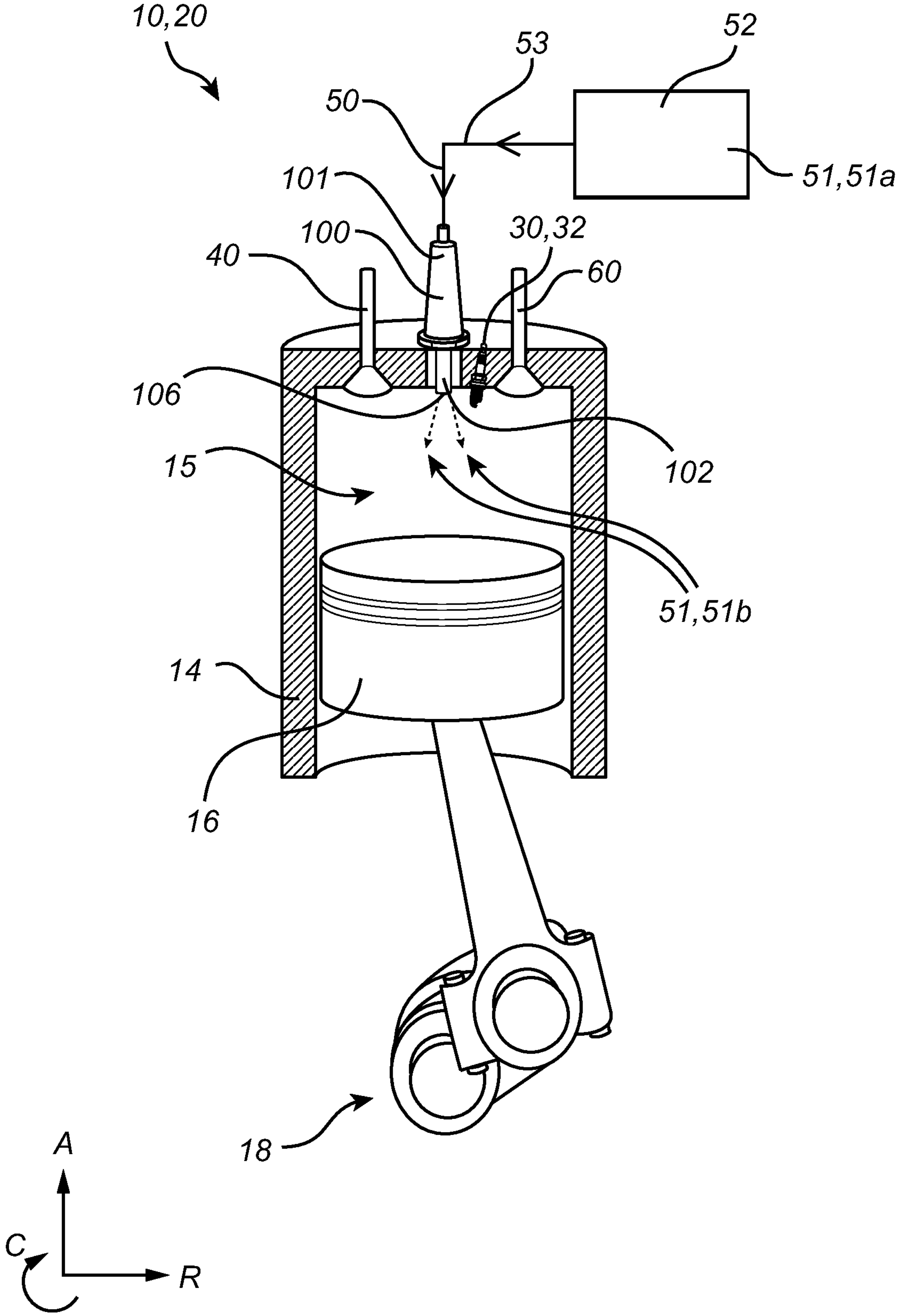
FIG. 2 is a perspective cross-sectional view of parts of a hydrogen internal combustion engine comprising a fuel gas injection arrangement according to example embodiments of the disclosure.

Turning now to FIG. 2, there is depicted one example embodiment of the ICE system 10 for incorporation in the vehicle 1 as described above in relation to FIG. 1. In particular, FIG. 2 is a perspective cross-sectional view of parts of a hydrogen internal combustion engine comprising the fuel gas injection arrangement 100 according to example embodiments of the disclosure. The fuel gas injection arrangement 100 is a fuel gas nozzle injection arrangement having a nozzle cap and an inlet valve arrangement, as will be further described in relation to FIGS. 3, 4A to 4D, 5A to 5C and 6. The fuel gas injection arrangement 100 here also comprises an injector body 101, as illustrated in FIG. 2.

FIG. 2 only depicts a single cylinder 14 having a combustion chamber 15 and a reciprocating piston 16 arranged therein. The piston 16 may typically comprise a piston bowl (not shown) facing the injector 100. In such a case, the flow of hydrogen is directed towards the piston bowl. Although FIG. 2 depicts a single cylinder, the ICE 20 generally comprises a plurality of cylinders 14 operated to combust fuel 51, such as hydrogen gas, whereby the motion of pistons 16 reciprocating in the cylinders 14 is transmitted to a rotational movement of a crank shaft 18. The crank shaft 18 is further coupled to a transmission (not shown) for providing a torque to driving elements (not shown). In case of a heavy-duty vehicle, such as a truck, the driving elements are wheels; however, the ICE 20 may also be used for other equipment such as construction equipment, marine applications, etc.

Generally, each cylinder 14 is provided with a corresponding piston 16 connected to the crankshaft 18 of the ICE 20. The ICE system 10 further comprises an intake manifold (not shown) forming intake guides arranged to guide air to the cylinders 14, and an exhaust guide (not shown) arranged to guide gases from the cylinders 14.

Each cylinder 14 may further comprise at its vertical top end at least one and typically a multiple number of inlet channels having at least one inlet valve 40 for controlling a flow of the inlet air to the combustion chamber 15, and at least one and typically a multiple number of exhaust channels having a least one exhaust valve 60 for controlling discharge of exhaust gases produced from the fuel combustion process taking place within the cylinder 14. The cylinder is only described in general terms since its parts and functionality is well known in the art. The ICE system 10 may also include additional engine components and system components.

Each one of the cylinders 14 defines at least partly a combustion chamber 15. As is also common, one end of the cylinder cavity is closed by a cylinder head. The piston 16 reciprocates in the cylinder and is connected to the crankshaft 18 so that the piston is set to reverse in the cylinder at an upper and lower dead centre position.

The ICE system 10 here further comprises a fuel system 50, as is commonly known in the art. As illustrated in FIG. 2, the fuel system 50 defines a common fuel line 53 and is configured to supply hydrogen gas to the cylinder(s) 16 by means of the fuel gas injection arrangement(s) 100. Optionally, the fuel system 50 may include the plurality of fuel gas injection arrangements 100. Alternatively, the fuel gas injection arrangements 100 may be separate parts arranged in fluid communication with the fuel system 50. The number of fuel gas injection arrangements 100 may be equal to the numbers of cylinders of the ICE 20. The fuel gas injection arrangements 100 are arranged in fluid communication with fuel line 53 of the fuel system 50.

The fuel system 50 here also comprises a fuel tank 52 containing the hydrogen fuel 51 in gaseous form 51*a*. The fuel 51 may also be partly arranged in liquid form in the fuel tank 52. The fuel 51 in the form of gaseous hydrogen 51*a* is supplied to the fuel gas injection arrangement of the ICE 20 from the fuel tank 52 via the fuel circuit 53 of the fuel system so.

The fuel circuit 53 is arranged and configured to contain and transport the fuel, as illustrated by the arrows in FIG. 2, and may optionally include one or more additional fuel system components such as a fuel pump, fuel filter etc. By way of example, one additional component is a pressure regulator that regulates the pressure from the tank pressure down to what is desired by the fuel injector. These components are of conventional types and thus not further described herein.

In addition, the ICE 20 comprises an ignition source 30. The ignition source 30 is arranged in the cylinder and at a location facing the combustion chamber 15, as illustrated in FIG. 2. By way of example, the ignition source 30 is arranged at an upper end of the combustion cylinder and spaced apart from the fuel injector 100, as illustrated in FIG. 2. Other arrangements of the ignition source and the fuel injector are also conceivable. For example, the fuel gas injection arrangement 100 can be arranged on one side, radially spaced apart from the axial centre, and the ignition source on the other side of the axial centre.

The ignition source 30 is configured to ignite the hydrogen gas jets 51, 51*b* supplied via the fuel gas injection arrangement 100. By way of example, the ignition source is a spark-plug 32. A spark plug is a device for delivering electric current from an ignition system to the combustion chamber of a spark-ignition engine to ignite the compressed fuel/air mixture by an electric spark, while containing combustion pressure within the engine. Typically, in each cylinder 14, there is a corresponding spark plug arranged to ignite a mix of fuel and oxygen in the cylinder. The hydrogen fuel is generally compressed to a certain level. The compressed air-fuel mixture is thus ignited by the spark plug.

Figure 3:
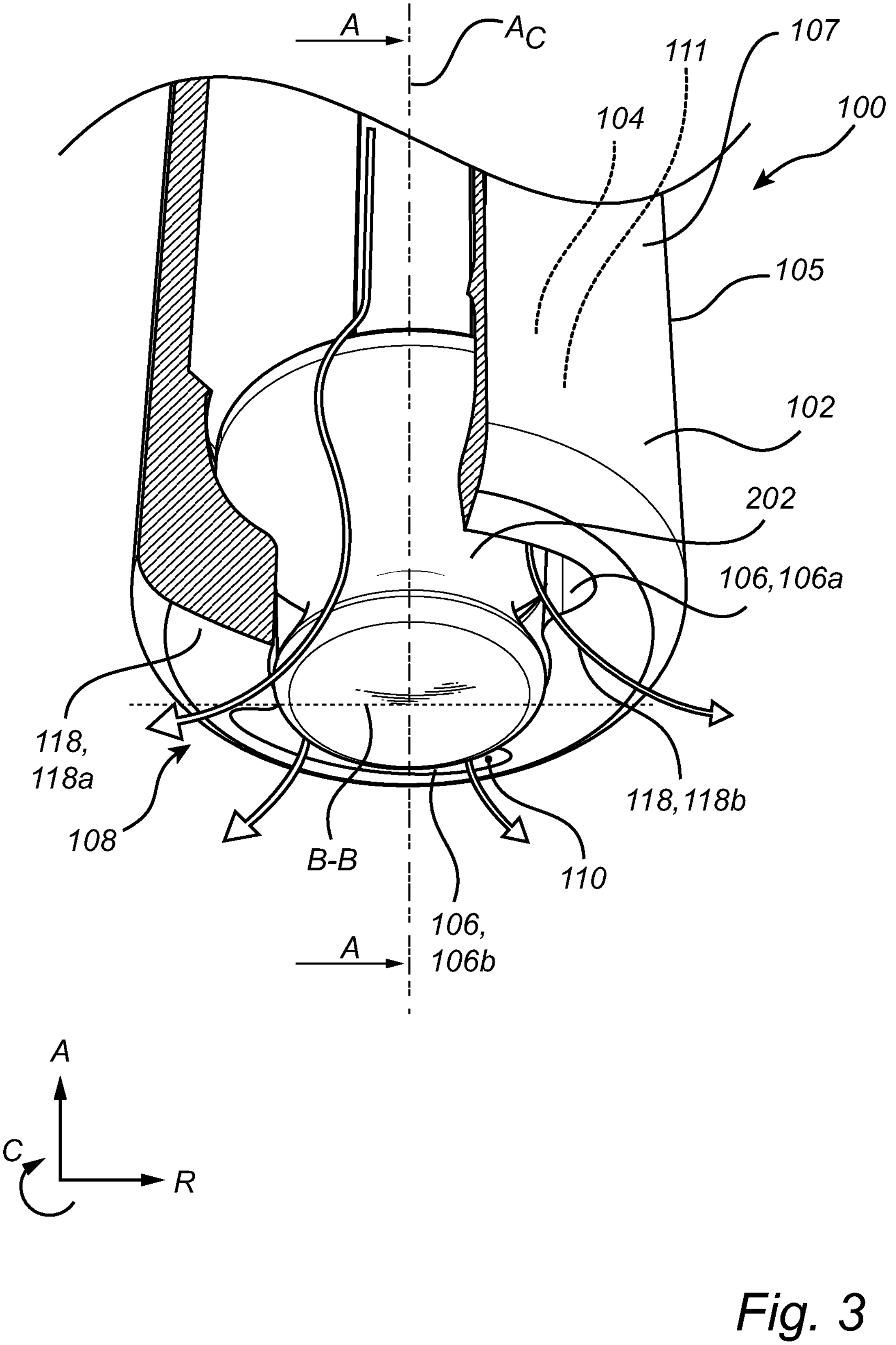
FIG. 3 is a perspective cut-out view of the fuel gas injection arrangement in FIG. 2 according to example embodiments of the disclosure.
Figure 4B:
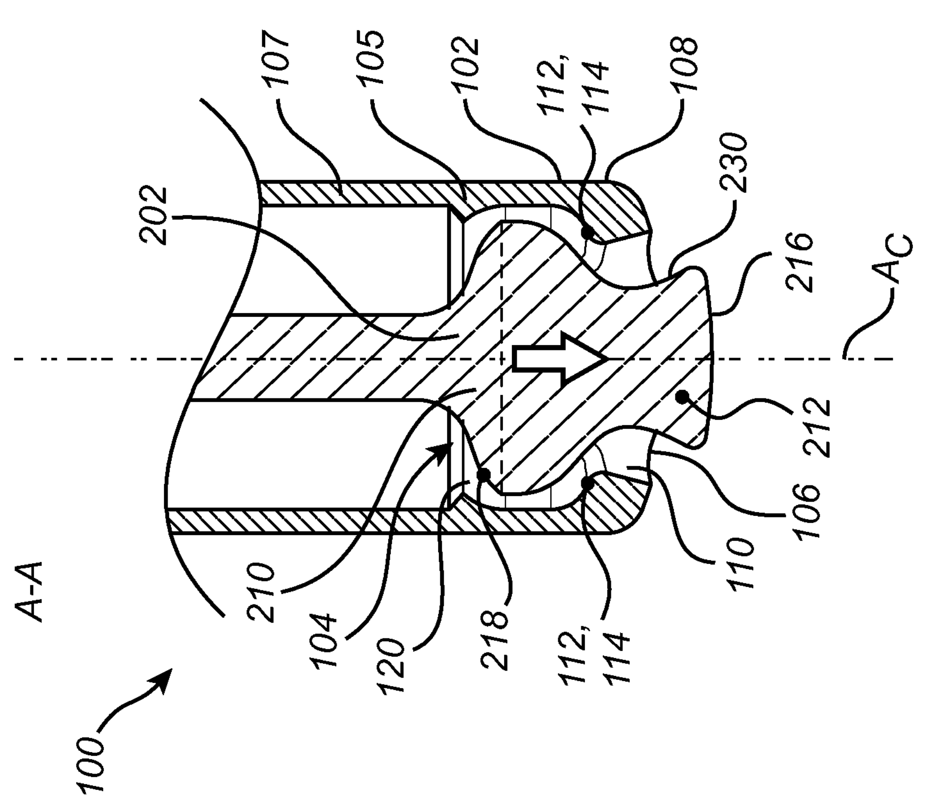
FIGS. 4A and 4B are cross-sectional side-views of a nozzle cap and a valve of the fuel gas injection arrangement illustrated in FIG. 3, according to example embodiments of the disclosure.
Figure 4A:
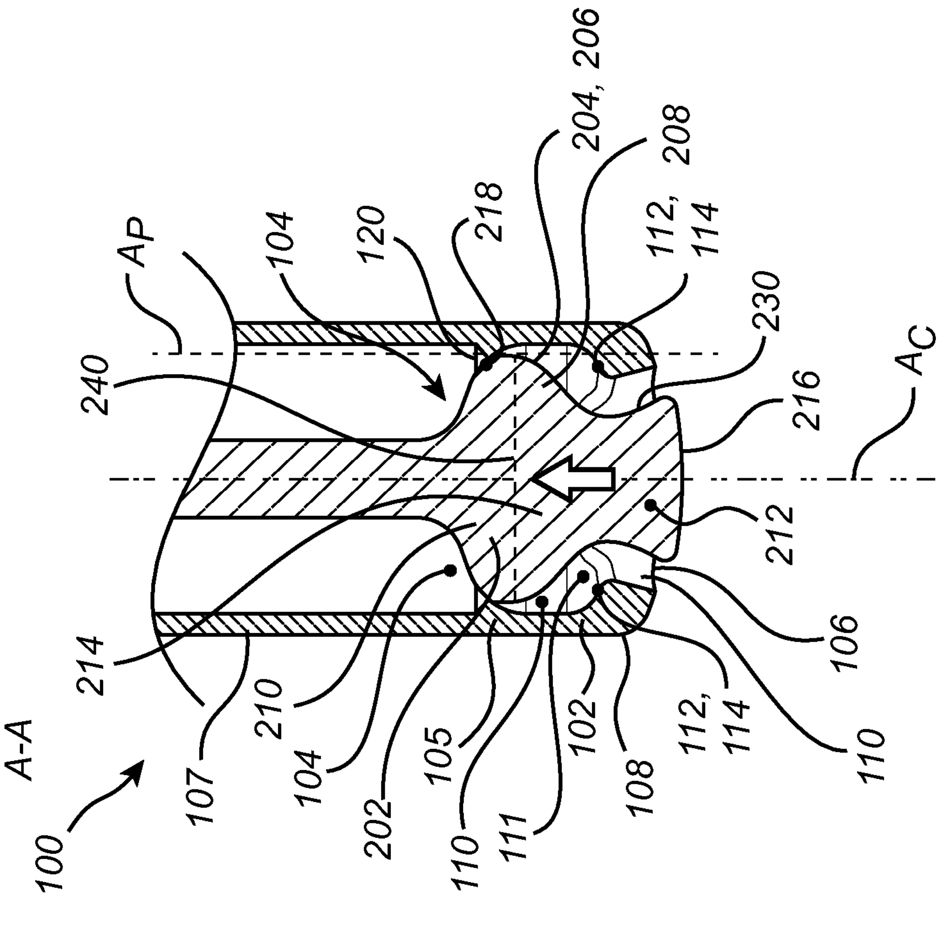
Figure 4D:
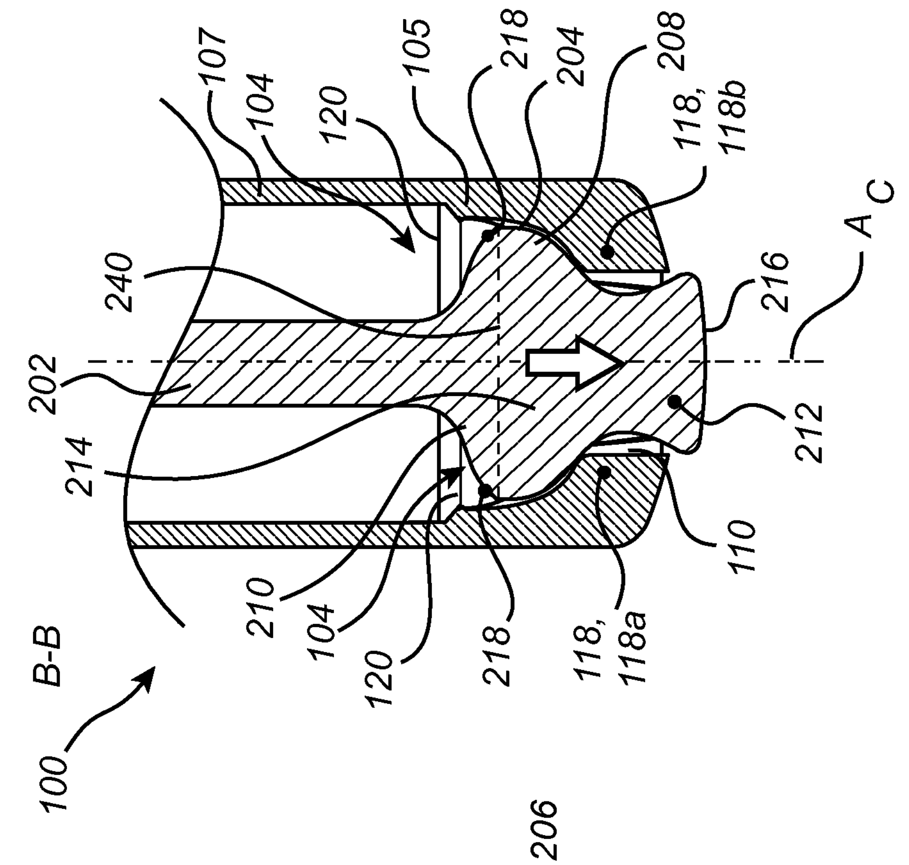
FIGS. 4C and 4D are other cross-sectional side-views of the nozzle cap and the valve of the fuel gas injection arrangement illustrated in FIG. 3, according to example embodiments of the disclosure.
Figure 4C:
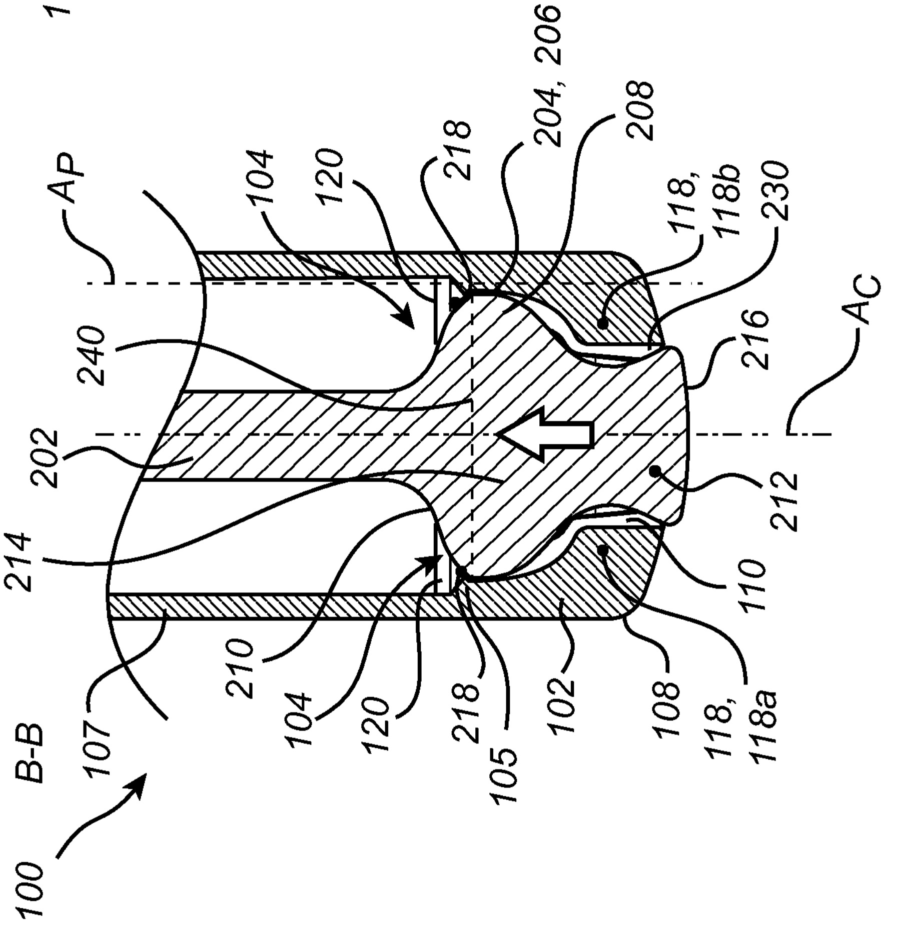
Figure 5A:
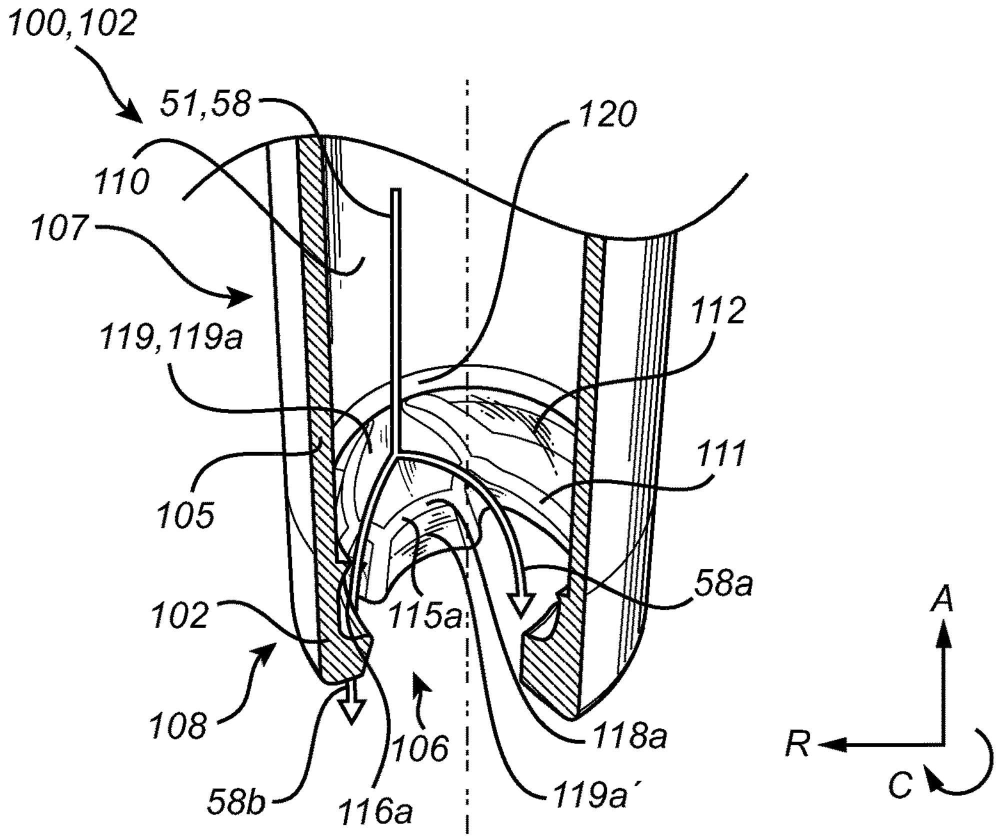
FIGS. 5A to 5C are perspective cross-sectional views of the nozzle cap of the fuel gas injection arrangement illustrated in FIG. 3, according to various example embodiments of the disclosure.
Figure 5B:
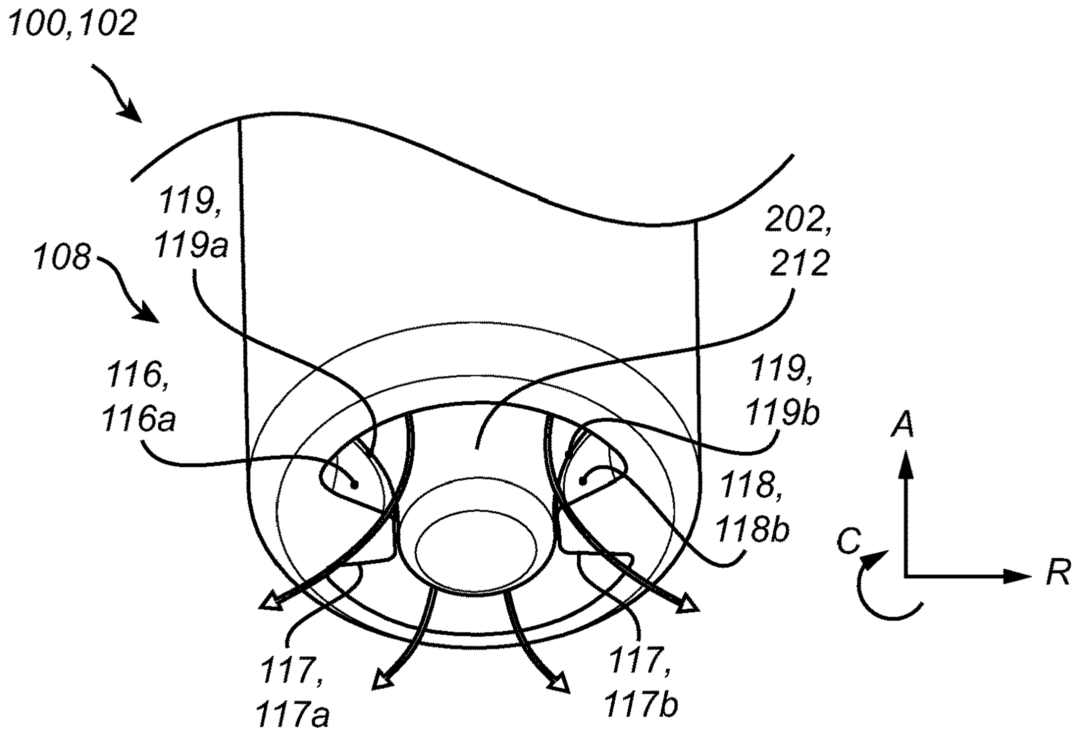
Figure 5C:
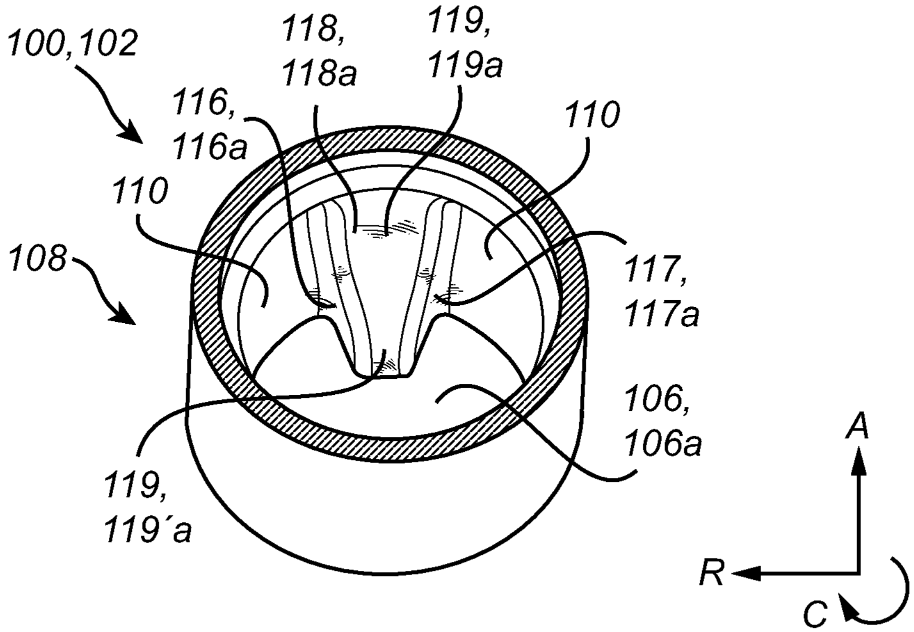

Turning again to the fuel gas injection arrangement 100 of the ICE system 10, one example embodiment of parts of the arrangement 100 will be described in relation to FIG. 3 in conjunction with FIGS. 4A to 4D, while FIGS. 5A to 5C illustrate further details of various designs of the nozzle cap of the fuel gas injection arrangement 100. In particular, FIG. 3 is a perspective cross-sectional view of the fuel gas injection arrangement 100 in FIG. 2 according to example embodiments of the disclosure. The fuel gas injection arrangement 100 comprises the nozzle cap 102.

As illustrated in e.g. FIGS. 2 and 3, the fuel gas injection arrangement 100 extends in an axial direction A and in a radial direction R. Further, the fuel gas injection arrangement 100 has a circumferential extension along a circumferential direction C. The fuel gas injection arrangement 100 also has a longitudinal centre axis Ac, which hereinafter is generally denoted as the axial centre axis. The axial centre axis of the fuel gas injection arrangement 100 is typically, although strictly not necessary, co-axially arranged with an axial centre axis of the piston, as illustrated in FIG. 2. However, in some examples, the axial centre axis of the fuel gas injection arrangement 100 may be slightly offset the axial centre axis of the piston. In some examples, the axial centre axis of the fuel gas injection arrangement 100 may be slightly inclined relative to the axial centre axis of the piston.

The terms "radial" or "radially" refer to the relative direction that is substantially perpendicular to an axial centreline of a particular component. Further, the term "longitudinal", "longitudinally", "axially" or "axial" refer to the relative direction that is substantially parallel and/or coaxially aligned to an axial centreline of a particular component. Also, the term "longitudinal", "longitudinally", "axially" or "axial" refer to a direction at least extending between axial ends of a particular component, typically along the arrangement or components thereof in the direction of the longest extension of the arrangement and/or components. The terms "vertical" and "vertically" generally correspond to the axial direction.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. Accordingly, in this context, the terms upstream and downstream are generally defined relative to the flow of fuel from the fuel tank 52 to the combustion chamber 15 of the cylinder 14, as illustrated in FIG. 2. Similarly, terms such as "upper", "above" and "top" as well as "lower", "bottom", "below" generally refer to the relative position of the part or component with respect to the axial direction.

The fuel gas injection arrangement 100 as illustrated in e.g. FIGS. 2 and 3, is arranged vertically into the centre of the roof of combustion chamber, typically into the cylinder head. The fuel gas injection arrangement 100 is further configured to admit fuel gas jets 51*b* into the combustion chamber 15 of an internal combustion engine 20. As such, the fuel gas injection arrangement 100 is situated directly at the combustion chamber and in the cylinder head, whereby the injector is capable of directly injecting hydrogen gas jets into the combustion chamber 15.

As mentioned above, the fuel gas injection arrangement 100 here comprises the injector body 101. In addition, the fuel gas injection arrangement 100 comprises the nozzle cap 102 and an inlet valve arrangement 202, as illustrated e.g. in FIG. 3. Hence, the nozzle cap is here defined as the outer part of the fuel gas injection arrangement 100. In addition, the nozzle cap 102 is here defined as the downstream part of the fuel gas injection arrangement 100. The nozzle cap 102 is configured to be attached to the injector body 101. Hence, the nozzle cap 102 and the injector body 101 are integral parts of the fuel gas injection arrangement 100. The nozzle cap can be attached to the injector body in several different manners, e.g. by a threaded fastener configuration, welded to the injector body or clamp-fitted to the injector body.

FIG. 3 depicts one example of the nozzle cap 102 for the fuel gas injection arrangement 100 in FIG. 2. FIGS. 4A and 4B are cross-sectional side-views of the nozzle cap 102 and the valve 202 of the fuel gas injection arrangement along the cross-section A-A illustrated in FIG. 3, while FIGS. 4C and 4D are cross-sectional side-views of the nozzle cap 102 and the valve 202 of the fuel gas injection arrangement along the cross-section B-B illustrated in FIG. 3.

As illustrated in FIG. 3 and further in FIGS. 4A to 4D, the fuel gas injection arrangement 100 comprises the inlet valve arrangement 202. The inlet valve arrangement 202 is at least partly housed by the nozzle cap 102. The inlet valve arrangement may herein be denoted as the valve arrangement or even simply as the valve 202. The valve 202 is considered an inlet valve arrangement as it is generally disposed in an inlet portion of the fuel injection arrangement, typically corresponding to the inlet region of the nozzle cap, see e.g. FIG. 3.

By way of example, the nozzle cap 102 comprises a body part 105 defining an inner volume 11, as shown in FIG. 3, and also in FIGS. 4A to 4D. The inner side of the body part, defining the inner volume 11, is shaped to accommodate a part of the valve arrangement 202. In the example illustrated in FIGS. 4A to 4D, the nozzle cap 102 accommodates the entire valve arrangement 202. Further, as may be gleaned from e.g. FIG. 4A, and further in e.g. FIGS. 5A to 5C, the nozzle cap has an inner side 110, also denoted as an inner circumferential side.

The inner side 110 generally extends in the circumferential direction of the nozzle cap 102. The inner side 110 also extends in the axial direction of the nozzle cap 102. The inner circumferential side 110 has an inner circumferential surface.

In addition, the nozzle cap 102 comprises opposite axial end portions 107 and 108. Accordingly, the body part 105 is here provided with the axial end portions 107 and 108. The axial end portion 107 is an upstream axial end portion 107. The axial end portion 108 is a downstream axial end portion 108. Also, as illustrated in e.g. FIG. 3, and further in FIGS. 4A to 4D, the axial end portions 107 and 108 are upper and lower axial end portions 107, 108, respectively.

The nozzle cap 102 also comprises an inlet 104 for receiving a flow of hydrogen in gaseous form. The inlet is generally arranged at the upstream axial end portion 107 of the nozzle cap 102. The flow of hydrogen is provided from the storage tank 52 (FIG. 2) of hydrogen in gaseous form. The hydrogen gas is typically pressurised. The flow of hydrogen through the inlet 104 is controllable by the inlet valve 202 arranged in the inlet 104. The valve 202 is here a pintle valve extended with a body portion, as illustrated in e.g. FIGS. 4A to 4D, and also further described hereinafter. However, the valve 202 can be provided in several different shapes and configurations. When a part of the valve 202 is in an upper position (FIGS. 4A and 4C), the inlet 104 is closed and hydrogen is not allowed to enter the nozzle cap volume 11. In the lower position shown in e.g. FIGS. 4B and 4D, the inlet 104 is open and hydrogen is allowed to enter the nozzle cap volume 11.

In other words, the inlet valve arrangement 202 is movable between a closed position, as illustrated in FIG. 4B, at which a portion of the inlet valve arrangement 202 is arranged in abutment with a valve seat 120, to prevent hydrogen gas from entering the inlet 104 of the nozzle cap 102, and an open position, as illustrated in FIG. 4A, at which the flow of hydrogen gas is allowed to flow between the inlet 104 and the at least one outlet 106 of the nozzle cap 102. Hence, the nozzle cap 102 also comprises the valve seat 120 whereby the movable valve 202 is sealing against the valve seat when the valve 202 is in the closed state relative to the valve seat and where hydrogen streams are allowed to pass when the valve 202 is arranged in the open position relative to the valve seat 120. To this end, the flow of hydrogen through the fuel gas injection arrangement 100 is restricted by having a part of the movable valve 202 to seal against an inner part (inner side 110) of the non-movable nozzle cap 102 in the radial direction R and about the entire circumferential direction C. Accordingly, the valve seat 120 is a part of the non-moving part (nozzle cap) towards which the moving part (valve) seals.

The movement of the valve arrangement 202 between the open and closed positions is generally govern by the pressure-situation upstream and downstream the injection arrangement 100 and controlled by an actuator or the like of the fuel gas injection arrangement 100.

As depicted in FIG. 3, the nozzle cap 102 comprises at least one outlet 106 for providing an exit flow of hydrogen. The at least one outlet is 106 arranged at the downstream axial end portion 108 of the nozzle cap 102, as illustrated in e.g. FIG. 4A.

The outlet 106 is configured to permit discharge of one or more gas jets 51*b* of fuel into the combustion chamber 15 of the internal combustion engine. Further details of the axial end portion 108 and the outlet 106 will be described hereinafter.

Turning again to the interplay with the nozzle cap 102 and the valve arrangement 202, the valve arrangement 202 comprises an axially extending flow guiding portion 204, as shown in FIGS. 4A to 4D. The axially extending flow guiding portion 204 has an envelope surface 206 facing the inner side 110 of the nozzle cap 102, see e.g. FIG. 4A. The envelope surface 206 comprises a valve protrusion 208 protruding radially towards the inner side 110 of the nozzle cap 102, as shown in e.g. FIGS. 4*c* to 4D. Typically, although strictly not required, the valve protrusion 208 extends circumferentially around the envelope surface 206.

In a similar vein, the nozzle cap 102 comprises a circumferential inner flow-guiding portion 112 having a protrusion 114 protruding radially from the inner side 110. The protrusion 114 may be denoted as the nozzle protrusion 114 for ease of reference.

As illustrated in e.g. FIGS. 4*c* to 4D, the nozzle protrusion 114 of the circumferential inner flow-guiding portion 112 protrudes radially towards the envelope surface 206 of the flow guiding portion 204.

As depicted in e.g. FIG. 4A, the nozzle protrusion 114 is arranged axially between the valve protrusion 208 and the outlet 106 of the nozzle cap 102.

The nozzle cap flow-guiding portion 112 and the valve protruding flow-guiding portion 204 are configured to cooperate to guide gaseous hydrogen 51*a* inside the nozzle cap 102. By way of example, assuming the valve 202 is oriented in its open position (FIG. 4B) during an injection of hydrogen gas into the combustion chamber 15, the hydrogen gaseous flow 51*a* enters through the inlet 104 and is initially guided by an upper part of the axially extending flow guiding portion 204 of the valve 202 and the valve seat 120 before it enters the nozzle cap volume 11. If the axially extending flow guiding portion 204 was not present, vortices may be created inside the nozzle cap and suboptimal flow of hydrogen towards the outlet 106 may be obtained. However, as provided by the embodiments herein, the axially extending flow guiding portion 204 provides improved hydrogen flow guidance towards the outlet 106.

Subsequently, the streams of hydrogen gas 51*a* are guided further downstream in the nozzle cap 102 by the inner flow-guiding portion 112 of the nozzle cap 102. The inner flow-guiding portion 112 of the nozzle cap 102 provides additional improved hydrogen flow guidance towards the outlet 106.

To this end, the axially extending flow-guiding portion 204 of the valve 202 and the inner flow-guiding portion 112 of the nozzle cap 102 ensures that the flow of hydrogen follows its shape and is guided towards the outlet 106.

Optionally, the valve protrusion 208 and the circumferential inner flow-guiding portion 112 of the nozzle cap at least partly overlap in the radial direction R, as illustrated in e.g. FIG. 4A. In FIG. 4A, this radial overlap in the radial direction R is illustrated by a cross sectional plane $A_P$. The cross-sectional plane $A_P$ is offset in the radial direction R from the axial centre axis $A_C$. Hence, the valve protrusion 208 is arranged on the valve arrangement 202 to protrude radially towards the inner side 110 of the nozzle cap 102 and the circumferential inner flow-guiding portion 112 is arranged on the inner side 110 of nozzle cap 102 to protrude radially towards the axial centre axis $A_C$. Also, as illustrated in FIG. 4A, the valve protrusion 208 and the circumferential inner flow-guiding portion 112 are arranged to be located relative each other so as to be axially spaced apart from each other and arranged to overlap in the radial direction R.

In particular, the valve protrusion 208 and the nozzle protrusion 114 of the circumferential inner flow-guiding portion 112 are arranged at an axial distance from each other when the inlet valve arrangement 202 assumes the open position, as illustrated in FIGS. 4B and 4D.

As mentioned above, the inlet valve arrangement 202 is generally the movable part of the fuel gas injection arrangement 100, whilst the nozzle cap 102 is the non-movable part of the fuel gas injection arrangement 100. Thus, in the design examples of the fuel gas injection arrangement 100 including the inlet valve arrangement 202 with the valve protrusion 208, the valve protrusion 208 is arranged at an axial distance from the inlet 104 of the nozzle cap 102 when the inlet valve arrangement 202 assumes the closed position, as also shown in FIGS. 4A and 4C.

While the inlet valve arrangement 202 can be provided in several different configurations, the inlet valve arrangement 202 here also comprises a valve portion 210, as illustrated in FIGS. 4A to 4D. Moreover, the inlet valve arrangement 202 here comprises an axially extending head portion 212. The axially extending head portion 212 has an upper end 214 arranged at the valve portion 210. Moreover, the axially extending head portion 212 has a lower end 216 facing away from the valve portion 210. In this type of configuration of the inlet valve arrangement 202, the valve portion 210 comprises a surface 218 arranged in abutment with the valve seat 120, at least when the inlet valve arrangement 202 assumes the closed position, as shown in FIGS. 4A and 4C.

It may also be noted that when the inlet valve arrangement 202 is provided with the lower end 216, the lower end 216 is generally oriented in alignment in the axial direction A with the at least one outlet 106 of the nozzle cap 102 when the inlet valve arrangement 202 is in the open position relative to the nozzle cap 102, as illustrated in FIGS. 4B and 4D. This is further described below in relation to e.g. FIGS. 5A to 5C.

Optionally, the valve portion 210 and the head portion 212 are integrally formed with each other. The valve portion 210 and the head portion 212 may likewise be separate parts of the inlet valve arrangement 202 that are attached to each other so as to form the inlet valve arrangement 202. The distinction between the valve portion 210 and the head portion 212 is indicated in FIG. 4A with the dashed line 240. In addition, the inlet valve arrangement 202 and its components may be solid or partly hollow parts.

In a design when the inlet valve arrangement 202 comprises the axially extending head portion 212, the axially extending flow guiding portion 204 generally forms part of the head portion.

Optionally, as illustrated in e.g. FIG. 4A, the head portion 212 of the valve arrangement 202 further comprises a taper shaped surface 230 between the valve protrusion 208 and the lower end 216.

The head portion 212 can be provided in different shapes and configurations depending on the intended way of controlling the hydrogen streams inside the injection arrangement 100.

By way of example, and as illustrated in e.g. FIG. 4A, a diameter of the head portion 212 increases along the taper shaped surface 230 in a downstream direction from the valve protrusion to the lower end. Alternatively, a diameter of the head portion decreases along the taper shaped surface in a downstream direction from the valve protrusion to the lower end.

Turning now again to the nozzle cap 102 and the outlet 106 of the axial end portion 108, as illustrated in FIGS. 3, 4A to 4D and 5A to 5C. As illustrated in e.g. FIG. 2 in conjunction with FIG. 5A, the axial end portion 108 further comprises one or more radial protrusions 118, 118*a-n*. In FIGS. 3, 4A to 4D and 5A to 5C, the axial end portion 108 comprises two radial protrusions 118*a* and 118*b*. However, it should be noted that the nozzle cap may also be provided with one single radial protrusion 118, as shown in e.g. FIG. 6A. In such configuration, the outlet 106 has one outlet region 106*a*. The number of the radial protrusions may also be more than two, such as three or four radial protrusions (FIG. 6B). In such configuration, the outlet 106 has four outlet regions 106*a* to 106*d*. For ease of the reference, the following description of the radial protrusions will be provided in relation to the example illustrated in FIGS. 3, 4A to 4D and 5A to 5C, in which the number of radial protrusions is two, i.e. a first radial protrusion 118*a* and a second radial protrusion 118*b*.

Turning to e.g. FIG. 5A in conjunction with FIG. 3, each one of the radial protrusions 118*a*, 118*b* extends radially from the inner side 110 of the nozzle cap 102 towards the axial centre axis Ac. The two radial protrusions 118*a*, 118*b* are arranged essentially opposite each other. Further, the circumferential extension of each one of the radial protrusions 118*a*, 118*b* is delimited in the circumferential direction C by a pair of corresponding side sections 116, 117, as illustrated e.g. FIGS. 3 and 5A. Each one of the side sections 116, 117 extends in the axial direction A. Hence, the side sections 116 and 117 are denoted as axially extending side sections 116, 117. Accordingly, the first radial protrusions 118*a* comprises a pair of axially extending side sections 116*a*, 117*a*. Analogously, the second radial protrusion 118*b* comprises a pair of corresponding axially extending side sections 116*b*, 117*b*.

Accordingly, a circumferential extension of the outlet 106 is at least partly delimited by the radial protrusions 118*a*, 118*b*. This means that the outlet 106 of the nozzle cap 102 in FIGS. 3, 4A to 4D and 5A to 5C is split up into a first outlet region 106*a* and a second outlet region 106*b*. The first and second outlet regions are circumferentially spaced apart outlet regions 106*a*, 106*b*. As such, the radial protrusions 118*a*, 118*b* are distributed in the circumferential direction to define the two circumferentially spaced apart outlets 106*a*, 106*b*.

It should be noted that an outlet region of the outlet is generally defined by the outlet 106 of the nozzle cap 102 in combination with shape of the valve 202 as provided when the valve 202 is in the open position and arranged in the centre of the outlet 106 of the nozzle cap 102. This is at least partly due to the location of the valve 202 in the outlet 106 when the valve 202 is in the open position, as illustrated in FIGS. 3, 4A to 4D and 5A to 5B.

As depicted in e.g. FIGS. 5A and 5B, each one of the radial protrusions 118*a*, 118*b* comprises a corresponding inner surface region 119, 119*a*, 119*b*. Each one of the inner surface regions 119*a*, 119*b* is arranged to reduce a crossflow of the hydrogen gas flow inside the nozzle cap 102 and guide the hydrogen gas flow towards the outlets 106*a*, 106*b*. As such, the inner surface region 119 of the radial protrusion 118 is shaped to guide and re-directing a flow of hydrogen received from the inlet 104 towards the exit(s) of the outlet

106 provided by the outlets 106*a*, 106*b*. To this end, the protrusions 118*a*, 118*b* arranged between the outlets 106*a*, 106*b* further guide the flow of hydrogen by their inner surface regions 119*a*, 119*b* and by their axially extending side sections 116*a*, 117*a* and 116*b*, 117*b*, respectively. In this manner, each one of the radial protrusions 118*a*, 118*b* is arranged and configured to minimize crossflow of the hydrogen streams 51.

The direction of a main hydrogen fuel gas stream 58 of hydrogen fuel gas inside the nozzle cap 102 is illustrated in FIG. 5A, where the main stream is split up in first and second sub-streams 58*a*, 58*b* due to the arrangement and configuration of the radial protrusion 118*a*.

By way of example, the inner surface regions 119*a*, 119*b* of the two radial protrusions 118*a* and 118*b* are provided to guide the flow from the circular inlet 104 (located upstream the valve 202) to the outlet regions 106*a*, 106*b* so as to reduce the risk of creating side-flows in the circumferential direction C, which may disturb the direction of the main stream 58 of the hydrogen fuel gas 51 inside the nozzle cap 102.

Hence, in the open position (FIGS. 4B and 4D), the inner surface region 119 is positioned close to the valve body surface such that the exposed surface 119*a* of the inner surface region 119 together with the valve body surface restrict and guide the hydrogen flow towards the outlet 106, as illustrated in FIG. 5A. Accordingly, the radial protrusion 118 together with the valve body generally define the main path for the hydrogen from the inlet 104 to the outlet 106, see e.g. FIG. 5B.

In addition, the arrangement and configuration of each one of the radial protrusions 118*a*, 118*b* allows for preventing hydrogen gas 51 to flow in another direction than the desired direction, i.e. to flow from its main stream 58 towards one outlet, such as the outlet 106*a*, rather than changing direction to a flow to an adjacent hole, such as the outlet 106*b*. However, it should be noted that it may generally not be required, and not be possible, to provide for a complete sealing between the surfaces of the radial protrusion and the facing surface of the valve 202 since the valve is displacing from the closed position to the open position. Therefore, due to some desired tolerances, the nozzle cap and the valve may be designed with a small radial gap therebetween, i.e. at the downstream parts of the arrangement.

The inner surface region 119 here extends axially from a lowermost part of the axial end portion 108 of the nozzle cap 102 and towards the inlet 104. The inner surface region 119 can be provided in several different shapes and geometries depending on type of fuel gas and other characteristics of the fuel gas injection arrangement. In the example depicted in FIGS. 3, 4A to 4D and 5A to 5C, the inner surface region 119 comprises a first concave surface 119*a* followed by a second concave surface 119*a*'. In other examples, the inner surface region 119 is entirely concave. In other examples, the inner surface region 119 is entirely convex. By way of example, the convex surface is provided by a bulge portion, as illustrated in FIG. 5C. It may also be possible to provide the radial protrusion 118 with an essentially even inner surface region 119. In similar vein as with the concave surfaces, the convex surface extends axially from the axial end portion 108 of the nozzle cap 102 and in the direction towards the inlet 104. In other examples, the inner surface region 119 comprises two or more surfaces of different inclination angles.

Generally, a part of the inner surface region 119 is arranged to close the gap to the valve body and may thus not necessarily be positioned to guide the flow. By way of example, the surface 119*a* of the inner surface region 119 is arranged to guide the flow, while the surface 119*a*' is arranged to close the gap to the valve body, as illustrated in FIG. 5B. Hence, only the surface 119*a* is the exposed part of the inner surface region 119 that is capable of guiding the flow.

Accordingly, by providing an inner surface region 119 wherein one part 119*a* is exposed to the flow 51, 58, and another part 119*a*' is arranged to close the gap to the valve body, it becomes possible to minimise the crossflow since one part of the surface region 119 is closing the gap to the valve body, as shown in FIG. 5B. As such, the contact between the radial protrusion 118, via the surface 119*a*', and the valve 202 provides for stopping that path for the flow.

In the example with an inner surface region 119 including the first concave surface 119*a* followed by the second concave surface 119*a*', in the axial direction A, the first concave surface 119*a* generally transition to the second concave surface 119*a*' via a circumferential edge region 115*a*, as illustrated in e.g. FIG. 5A.

Moreover, each one of the radial protrusions 118*a*, 118*b* is here arranged downstream the inner circumferential radial protrusion 114 of the nozzle cap 102, as illustrated in e.g. FIG. 5A. Each one of the radial protrusions 118*a*, 118*b* is also arranged downstream the axially extending flow guiding portion 204 of the valve 202.

In addition, each one of the radial protrusions 118*a*, 118*b* is here arranged downstream an intermediate surface region provided in the form of the circumferential inner flow-guiding portion 112. Accordingly, the intermediate surface region, corresponding to the circumferential inner flow-guiding portion 112, is arranged axially above the radial protrusions 118.

As can be seen from FIGS. 4C and 4D, and further in FIGS. 5A and 5B, each one of the radial protrusions 118*a*, 118*b* are arranged radially opposite each other about the axial centre Ac. However, the number of radial protrusions and the relative arrangement of the radial protrusions 118*a*, 118*b* about the axial centre Ac may be varied in view of the design of ICE system.

Figure 6A:
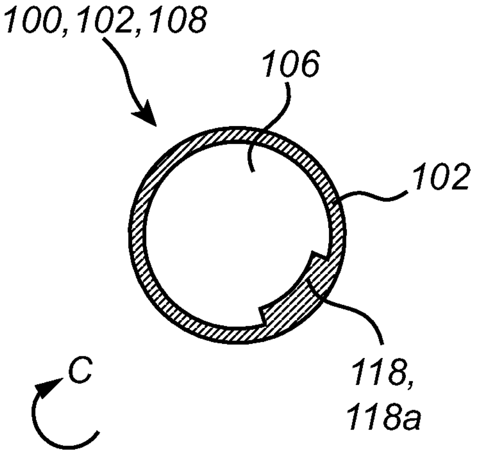
FIGS. 6A-6B conceptually illustrate different types of axial end portions of a nozzle cap according to example embodiments of the disclosure.
Figure 6B:
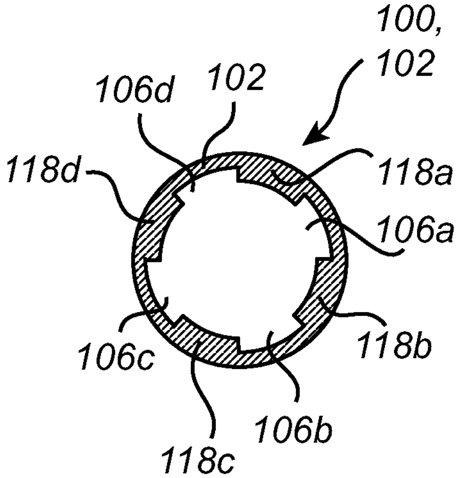

By way of example, FIG. 6A conceptually illustrates another design of the axial end portion of the nozzle cap. As illustrated in FIG. 6A, the axial end portion 108 of the nozzle cap 102 comprises a single radial protrusion 118*a*. In this design of the nozzle cap 102, the circumferential extension of the outlet 106, 106*a* is delimited by the circumferential extension of the radial protrusion 118*a*. In other words, a total circumferential extension of the at least one outlet is less than 360 degrees.

In another design, the axial end portion 108 of the nozzle cap 102 comprises four radial protrusions 118*a* to 118*d*. Moreover, there is provided a plurality of outlet regions 106*a* to 106*d* arranged in-between the four radial protrusions 118*a* to 118*d*. As such, the axial end portion of the nozzle cap may comprise a plurality of radial protrusions and a plurality of outlet regions.

Turning again to the shape and the design of the radial protrusion 118, the protruding radial protrusion 118 may generally transition to the inner surface, i.e. the inner side 110, of the nozzle cap in a relatively smoot manner, as illustrated in FIG. 3 in combination with FIGS. 4C-4D and 5A-5B. In particular, as illustrated in e.g. FIG. 5A, each one of the radial protrusions 118*a*, 118*b* also extends radially towards the inner side 110 of the nozzle cap 102 in the axial direction towards inlet 104. Further, the inner surface region 119, 119*a* is generally shaped to transition or align with an axially- (and here a vertical-) oriented surface of the inner side 110 of the nozzle cap 102 in a smooth manner, as illustrated in FIGS. 5A and 5B.

Moreover, each one of the radial protrusions 118*a*, 118*b* also extends radially towards the inner side 110 of the nozzle cap 102 in the circumferential direction towards inlet 104. That is, each one of the axially extending side sections 116*a*, 117*a* and 116*b*, 117*b*, respectively, is arranged to transition or align with the axially- (and here a vertical-) oriented surface of the inner side 110 of the nozzle cap 102 in a smooth manner, as illustrated in FIGS. 5A and 5B.

Generally, as illustrated in FIGS. 5A and 5B, each one of the radial protrusions 118*a*, 118*b* are preferably arranged in a taper-shaped configuration in the axial direction A towards the exit of the outlet 106. However, the sharpness of this inclination may be selected in different ways in view of the ICE system design. The design of the radial protrusion 118 illustrated in FIGS. 5A to 5B is one example of a possible arrangement of the inner surface region 119, however, it may also be possible to provide the inner surface region 119 with a different curvilinear design where the inner surface region 119*a*, 119*a*' transitions in the axial direction in a more distinct manner. FIG. 5C illustrates a perspective cross-sectional view of another design of the radial protrusion of the nozzle cap illustrated in FIG. 3. In this design of the radial protrusion of the nozzle cap, the inner surface region 119, 119*a* is configured to taper towards the exit of the outlet 106 in a curved manner that is essentially concave. In addition, each one of the radial protrusions 118*a*, 118*b* includes axially extending side sections 116*a*, 117*a* and 116*b*, 117*b*, respectively, that are essentially arranged perpendicularly to the axially- (and here a vertical-) oriented surface of the inner side 110 of the nozzle cap 102.

Moreover, in all example embodiments, as illustrated in e.g. FIG. 4D, a portion of the valve arrangement 202 is arranged in a face-to-face orientation with each one of the radial protrusions 118, 118*a*, 118*b*, when the valve arrangement 202 assumes the open position. Typically, although strictly not required, a portion of the valve arrangement 202 is arranged radially closed to, but not in physical contact with, each one of the radial protrusions 118, 118*a*, 118*b*, when the valve arrangement 202 assumes the open position.

Further, the size of the radial protrusions 118, 118*a*, 118*b* is generally selected in view of the dimension of the valve 202, and also in view of the overall design of the ICE system. Byway of example, the extension of the radial protrusion 118 in the radial direction R should be relatively large to fill-up the gap to the valve 202, while leaving a distance to provide the desired clearance, as mention above. To this end, each one of the radial protrusions 118, 118*a*, 118*b* generally extends relatively close to the valve 202, which advantageously further contribute to reducing cross-flow of hydrogen across upstream the exit of the outlet region 106. However, it should be noted that the size of the radial protrusion 118 should not compromise the ability for the valve 202 to move between its open and closed positions.

As mentioned above, the radial protrusion can be provided in several different manners as long as it provides for guiding the hydrogen flow towards the outlet 106 while reducing any crossflow of the hydrogen fuel. In this context, the term "crossflow" refers to its ordinary meaning as used within fluid dynamics and thermodynamics. Favourably, the radial protrusion may be provided with a smooth transition to the inner side surface of the nozzle cap.

The inner surface region 119 is in the illustrated example embodiments provided by the surface 119*a* and the surface 119*a*'. The surface 119*a* is arranged to face the hydrogen flow from the inlet, while the surface 119*a*' is arranged in a radial face-to-face orientation with the valve arrangement 202. The surface 119*a* defines any one of a concave and convex profile. The concave and convex profile can extend both in the circumferential direction C and in the axial direction A, as illustrated in the FIGS. 3 and 5A to 5C. In addition, the surface 119*a*' is generally provided to match the shape of the valve portion, i.e. the valve portion that is arranged in the face-to-face orientation with the surface 119*a*'. In the illustrated example embodiments, the surface 119*a*' is thus provided with a concave profile.

The extension of the radial protrusion 118 in the radial direction R is generally set by the radial distance between the inner side 110 of the nozzle cap and the body 212 of the valve arrangement 202. By way of example, the extension of the radial protrusion 118 in the radial direction R is defined by the radial distance between the inner side 110 of the nozzle cap at the axial end portion 108 and the surface 230 of the head portion 212 of the valve arrangement. Put it differently, the extension of the radial protrusion in the radial direction generally corresponds to the radial extension of the outlet, as defined by the arrangement of the valve body 212 at the centre of the outlet 106 relative to the inner side 110 of the nozzle cap.

The circumferential extension of the radial protrusion 118 may vary depending on nozzle cap and the number of radial protrusions. If the radial protrusion is a single radial protrusion, as illustrated in FIG. 5C, the circumferential extension of the radial protrusion 118 may be about between 5 degrees to 180 degrees, as defined about the centre axis Ac. In some examples, the circumferential extension of the radial protrusion 118 may be about between 90 degrees to 180 degrees for a nozzle cap with a single radial protrusion. For examples with several radial protrusions 118, as illustrated in e.g. FIG. 6B, the circumferential extension of each radial protrusion 118 may be about between 5 to 25 degrees. Preferably, the circumferential extension of each radial protrusion 118 may be about between 5 to 15 degrees. Other ranges and extensions are also conceivable.

Due to the combined arrangement of the at least one radial protrusion 118, the flow-guiding portion 204 of the valve 202 and the inner flow-guiding portion 112 of the nozzle cap 102, their corresponding inner surface region 119, inner circumferential radial protrusion 114 and valve protrusion 208 cooperate to fluidly guide the flow of hydrogen towards the outlet 106. In particular, the inner circumferential radial protrusion 114 and valve protrusion 208 cooperate to guide the flow of hydrogen towards the outlet 106 whereby the radial protrusion 118 is located to further guide the flow of hydrogen by its sides 116, 117 to the exit of the outlet 106, while the radial protrusion also being capable of minimizing crossflow of hydrogen streams, as illustrated in e.g. FIG. 5A.

Optionally, the inner flow-guiding portion 112 of the nozzle cap 102 and the inner surface region 119 of the radial protrusion 118 form a continuous flow-guiding surface extending along the nozzle cap 102 in the axial direction A.

To sum up, the inner circumferential radial protrusion 114 has a flow-guiding surface configured to guide a flow of hydrogen from the inlet 102 towards the outlet 106, the valve protrusion 208 has a corresponding flow-guiding surface, generally being a part of the envelope surface, configured to guide a flow of hydrogen from the inlet 102 towards the outlet 106, and the inner surface region 119 of the radial protrusion has at least one flow-guiding surface configured to guide a flow of hydrogen from the inlet 102 towards the outlet 106.

Although other possibilities are conceivable, the nozzle caps are preferably made of steel. In a similar vein, the valve 202 and the overall fuel gas injection arrangement 100 are preferably made of steel. Moreover, the fuel gas injection arrangement 100 is here generally a single nozzle configuration.

The fuel gas injection arrangement 100 as illustrated in the Figures, e.g. FIG. 3 may include a number of additional components, such as an actuator (not shown). The actuator is generally arranged in communication with the control unit 90. The control unit 90 is configured to control the operation of the fuel gas injection arrangement 100. The control unit 90 may be a separate part of a power unit of the fuel injector. Alternatively, the control unit may be a part of the electronic control unit of the vehicle. By way of example, the electronic control unit of the vehicle generates a control signal to the power unit of the fuel injector, which transforms the control signal into an actuation signal for the injection arrangement 100. The actuator signal is transferred to the injector, preferably to the actuator of the injection arrangement 100. Subsequently, the actuator controls the movement of the valve 202 within the injection arrangement 100. The actual actuation of the control of the injection arrangement 100 and movement of the valve 202 can be provided by an actuator of various kind, such as a solenoid, piezo or the like.

Byway of example, the fuel gas injection arrangement as illustrated in the Figures, e.g. FIG. 3 is controllable by the control unit 90 to inject hydrogen gas into the combustion chamber with a low injection pressure of between 15 to 60 bar. In particular, the fuel gas injection arrangement as illustrated in the Figures, e.g. FIG. 3 is controllable by the control unit to inject hydrogen gas into the combustion chamber with a low injection pressure of between to 30 bar.

As mentioned above, the control unit 90 is typically configured to control the fuel gas injection arrangement 100 in response to one or more control signals. The control signal can include different types of data and instructions for the arrangement 100. By way of example, the control signal contains data indicative of a hydrogen system pressure, a number of injections per engine cycle, a timing for start of each injection, a duration of each injection, a separation time between injections.

By way of example, the control unit 90 is arranged and configured to inject hydrogen directly into the cylinder during a compression stroke. In addition, the fuel injection is generally controlled to occur when the intake valves 40 are completely closed.

The control unit 90 here also controls the movement of the inlet valve arrangement 202 by controlling one or more actuators in communication with the inlet valve arrangement 202. The movement of the inlet valve arrangement 202 may as an example be controlled on the basis of a control signal containing data indicating the pressure upstream and downstream the fuel gas injection arrangement 100.

The control unit may include a microprocessor, microcontroller, programmable digital signal processor or another programmable device. Thus, the control unit typically comprises electronic circuits and connections as well as processing circuitry such that the control unit can communicate with different parts of the ICE system such as the ICE, fuel gas injection arrangement 100 and any other component of the vehicle, such as the clutch, the gear box and/or any other parts in need of being operated in order to provide the functions of the example embodiments. The control unit may comprise modules in either hardware or software, or partially in hardware or software and communicate using known transmission buses such as CAN-bus and/or wireless communication capabilities. In one example, the control unit comprises the processing circuitry configured to operate the fuel injection arrangement 100. The processing circuitry may be a general purpose processor or a specific processor. The control unit typically comprises a non-transitory memory for storing computer program code and data upon. Thus, the control unit may be embodied by many different constructions.

The control unit 90 may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure also relates to an ICE system in the form of a hydrogen internal combustion engine comprising the fuel gas injection arrangement 100, as described herein. The present disclosure further relates to a vehicle comprising the fuel gas injection arrangement as described herein and/or the hydrogen ICE system, as described herein.

Even though the disclosure has been described with reference to specific exemplifying embodiments thereof, many different alterations, modifications and the like will become apparent for those skilled in the art. Accordingly, it is to be understood that the present disclosure is not limited to the embodiments described above and illustrated in the drawings; rather, the skilled person will recognize that many changes and modifications may be made within the scope of the appended claims.

The invention claimed is:

1. A nozzle cap for a fuel gas injection arrangement of an internal combustion engine, said nozzle cap comprising:

a body part defining an inner volume for accommodating a part of a movable valve arrangement, an inlet for receiving gaseous fuel, at least one outlet arranged at an axial end portion of the nozzle cap, said at least one outlet being configured to permit discharge of one or more gas jets of fuel into a combustion chamber of the internal combustion engine, wherein the axial end portion of the nozzle cap further comprises a radial protrusion extending from an inner side of the nozzle cap towards an axial centre axis and further delimited in a circumferential direction by axially-extending side sections, said radial protrusion having an inner surface region for reducing a crossflow of the fuel gas flow inside the nozzle cap and guiding said fuel gas flow towards the at least one outlet, wherein the inner surface region comprises a convex surface.

2. The nozzle cap according to claim 1, wherein a circumferential extension of the at least one outlet is at least partly delimited by the radial protrusion.

3. The nozzle cap according to claim 1, wherein the at least one outlet comprises a plurality of circumferentially spaced apart outlet regions.

4. The nozzle cap according to claim 3, further comprising a number of radial protrusions distributed in the circumferential direction to at least partly define the plurality of the circumferentially spaced apart outlet regions.

5. The nozzle cap according to claim 4, wherein the number of radial protrusions is two and the number of the circumferentially spaced apart outlet regions is two, wherein the two radial protrusions are arranged essentially opposite each other.

6. The nozzle cap according to claim 1, wherein the inner side of the nozzle cap further comprises an intermediate surface region arranged axially above said radial protrusion, said intermediate surface region having a circumferential inner flow-guiding portion for directing the flow of fuel gas inside the nozzle cap.

7. A fuel gas injection arrangement for admitting at least one fuel gas jet into a combustion chamber of an internal combustion engine, the fuel gas injection arrangement comprising a nozzle cap according to claim 1 and an inlet valve arrangement at least partly housed by the nozzle cap, the inlet valve arrangement being movable between a closed position at which a portion of the inlet valve arrangement is arranged in abutment with a valve seat to prevent fuel gas from entering the inlet of the nozzle cap, and an open position at which the flow of fuel gas is allowed to flow between the inlet and the at least one outlet of the nozzle cap.

8. The fuel gas injection arrangement according to claim 7, wherein the valve arrangement comprises an axially extending flow guiding portion comprising an envelope surface facing the inner side of the nozzle cap, the envelope surface comprising a valve protrusion protruding radially towards the inner side of the nozzle cap.

9. The fuel gas injection arrangement according to claim 7, wherein the circumferential inner flow-guiding portion of the nozzle cap comprises a protrusion protruding radially towards the envelope surface of the flow guiding portion, the nozzle protrusion being arranged axially between the valve protrusion and the at least one outlet of the nozzle cap.

10. The fuel gas injection arrangement according to claim 9, wherein the valve protrusion and the circumferential inner flow-guiding portion of the nozzle cap at least partly overlap in the radial direction.

11. The fuel gas injection arrangement according to claim 8, wherein the valve protrusion extends circumferentially around the envelope surface.

12. The fuel gas injection arrangement according to claim 8, wherein the valve protrusion and the protrusion of the circumferential inner flow-guiding portion are arranged at an axial distance from each other when the inlet valve arrangement assumes the open position.

13. The fuel gas injection arrangement according to claim 8, wherein the valve protrusion is arranged at an axial distance from the inlet of the nozzle cap when the inlet valve arrangement assumes the closed position.

14. The fuel gas injection arrangement according to claim 1, wherein the inlet valve arrangement comprises a valve portion and an axially extending head portion having an upper end arranged at the valve portion, and a lower end facing away from the valve portion, wherein the valve portion comprises a surface arranged in abutment with the valve seat when the inlet valve arrangement assumes the closed position.

15. The fuel gas injection arrangement according to claim 14, wherein the valve portion and the head portion are integrally formed with each other.

16. The fuel gas injection arrangement according to claim 14, wherein the axially extending flow guiding portion forms part of the head portion.

17. The fuel gas injection arrangement according to claim 14, wherein the head portion comprises a taper shaped surface between the valve protrusion and the lower end.

18. The fuel gas injection arrangement according to claim 17, wherein a diameter of the head portion increases along the taper shaped surface in a direction from the valve protrusion to the lower end.

19. The fuel gas injection arrangement according to claim 17, wherein a diameter of the head portion decreases along the taper shaped surface in a direction from the valve protrusion to the lower end.

20. The fuel gas injection arrangement according to claim 1, wherein a portion of the valve arrangement is arranged in a radial face-to-face orientation with the at least one radial protrusion when the valve arrangement assumes the open position.

21. The fuel gas injection arrangement according to claim 1, further comprising a control unit configured to control the operation of the fuel gas injection arrangement.

22. The fuel gas injection arrangement according to claim 21, wherein the fuel gas injection arrangement is controllable by the control unit to inject fuel into a combustion chamber with a low injection pressure of between 15 to 60 bar.

23. The fuel gas injection arrangement according to claim 21, wherein the control unit is configured to control the fuel gas injection arrangement in response to a control signal containing data being indicative of at least one of a hydrogen system pressure, a number of injections per engine cycle, a timing for start of each injection, a duration of each injection, and a separation time between injections.

24. A hydrogen internal combustion engine comprising a nozzle cap according to claim 1.

25. A vehicle comprising a fuel gas injection arrangement according to claim 1.

* * * * *